June 14, 1966  W. R. SCHACK ET AL  3,255,690
PRESSURE CHAMBER STRUCTURE
Filed Dec. 30, 1963  5 Sheets-Sheet 1
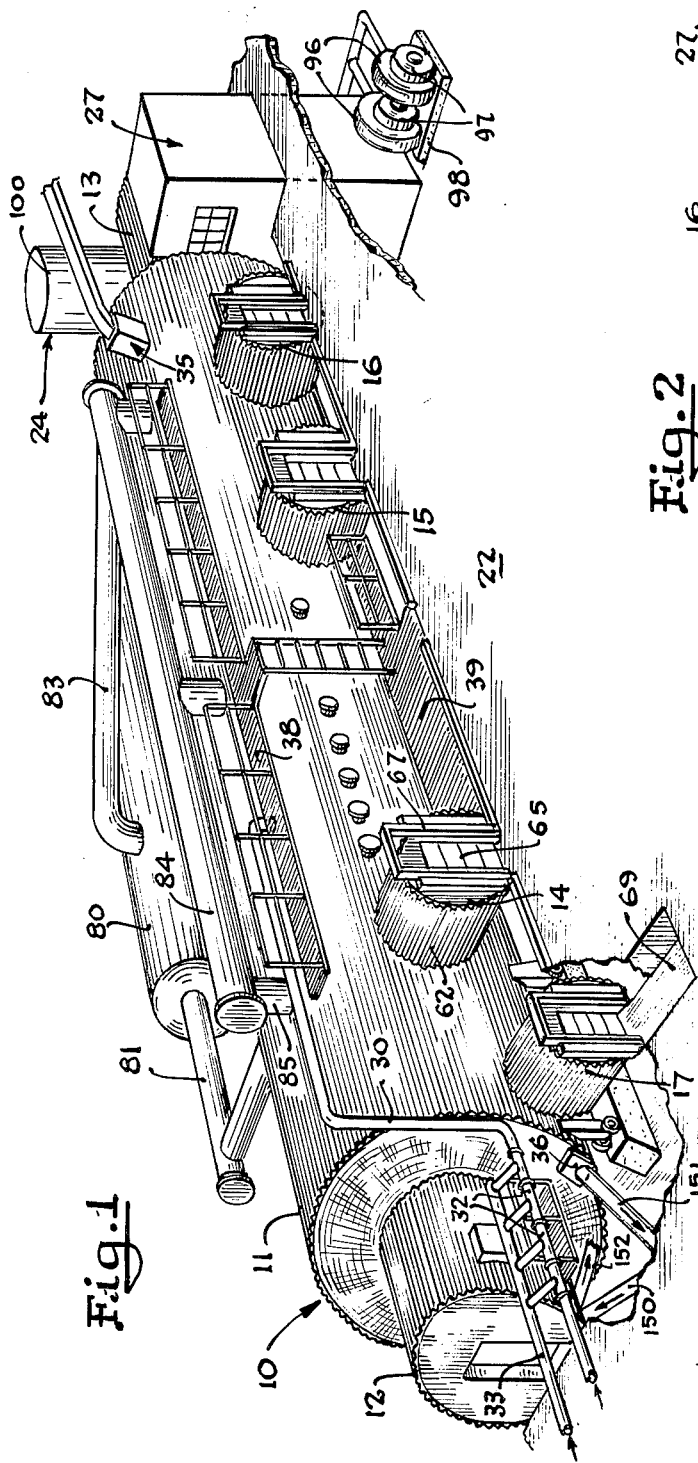
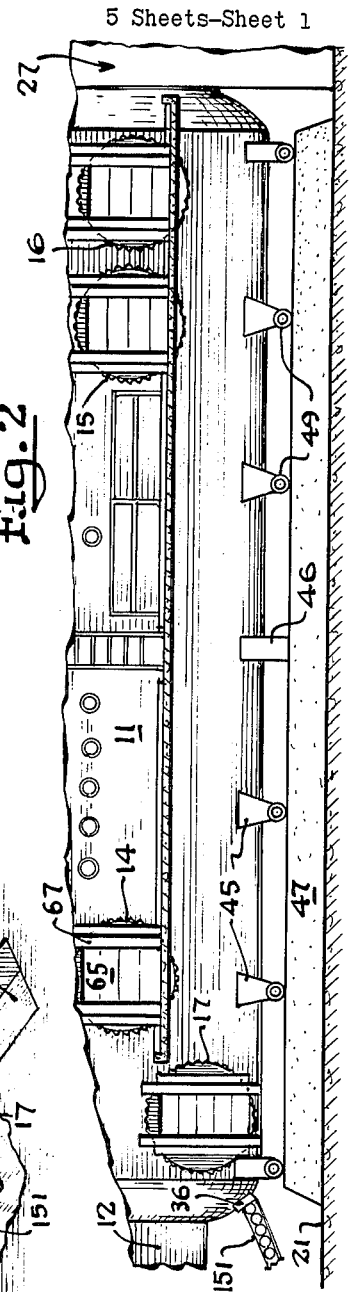
Inventors
Warren R. Schack
Marshall Long
By
R. A. Story
Attorney

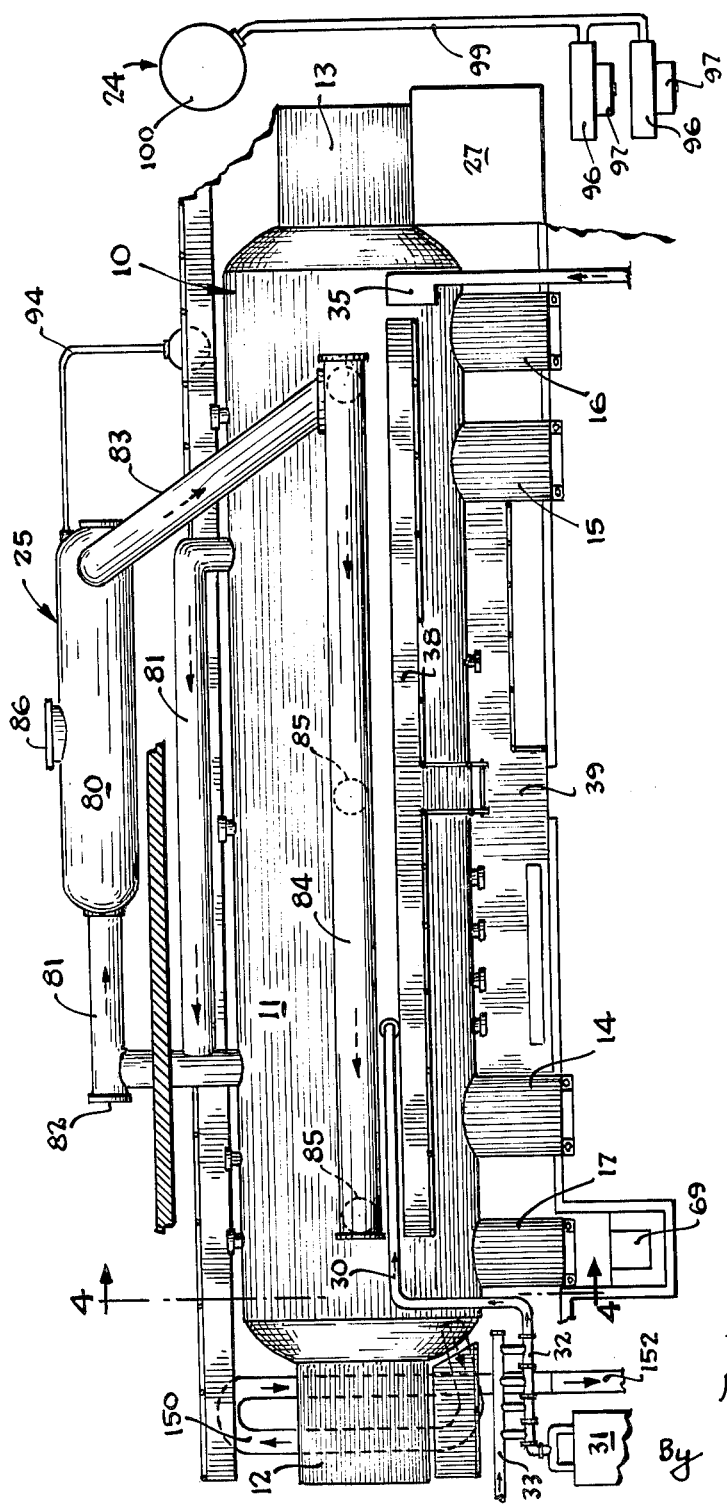

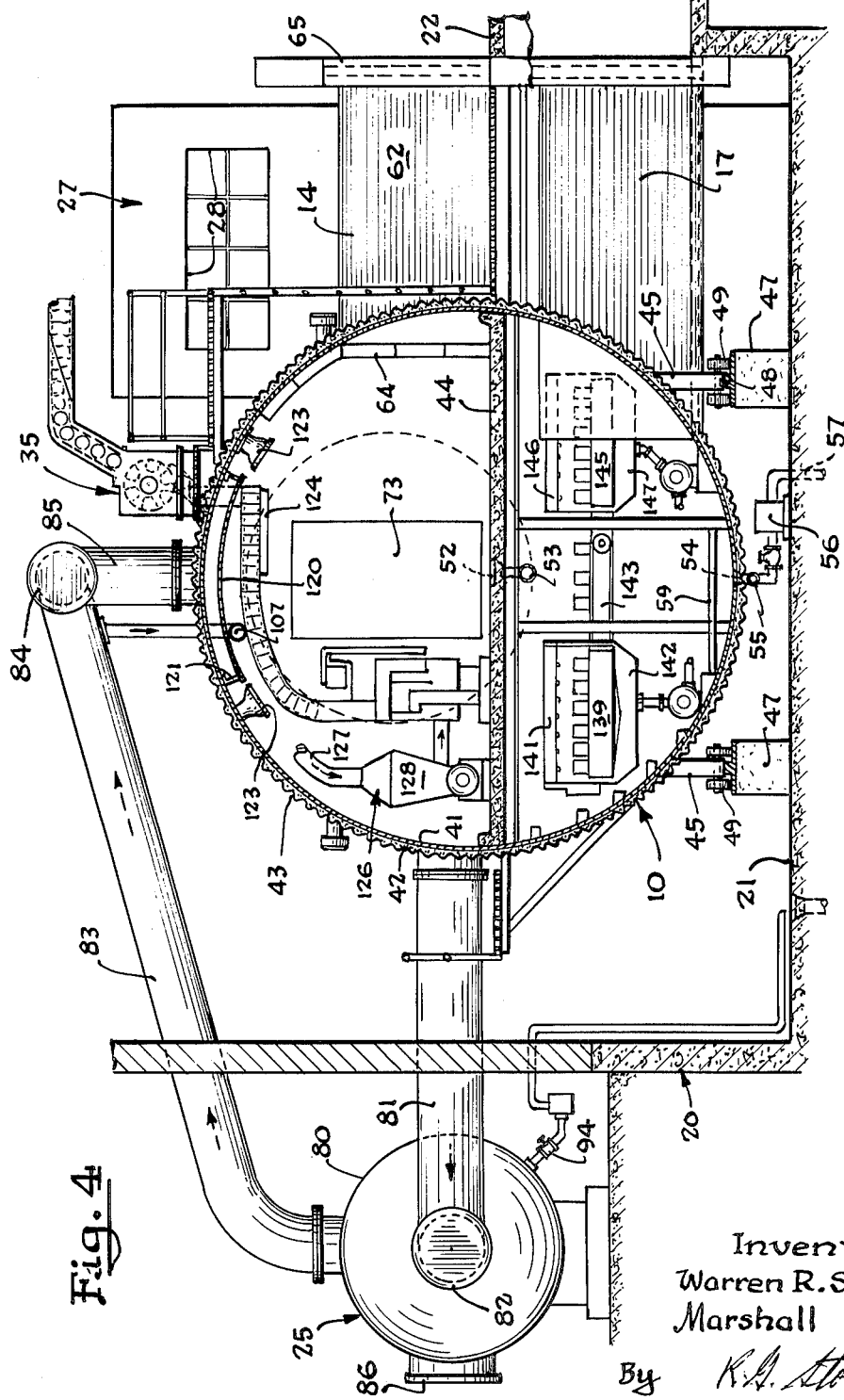

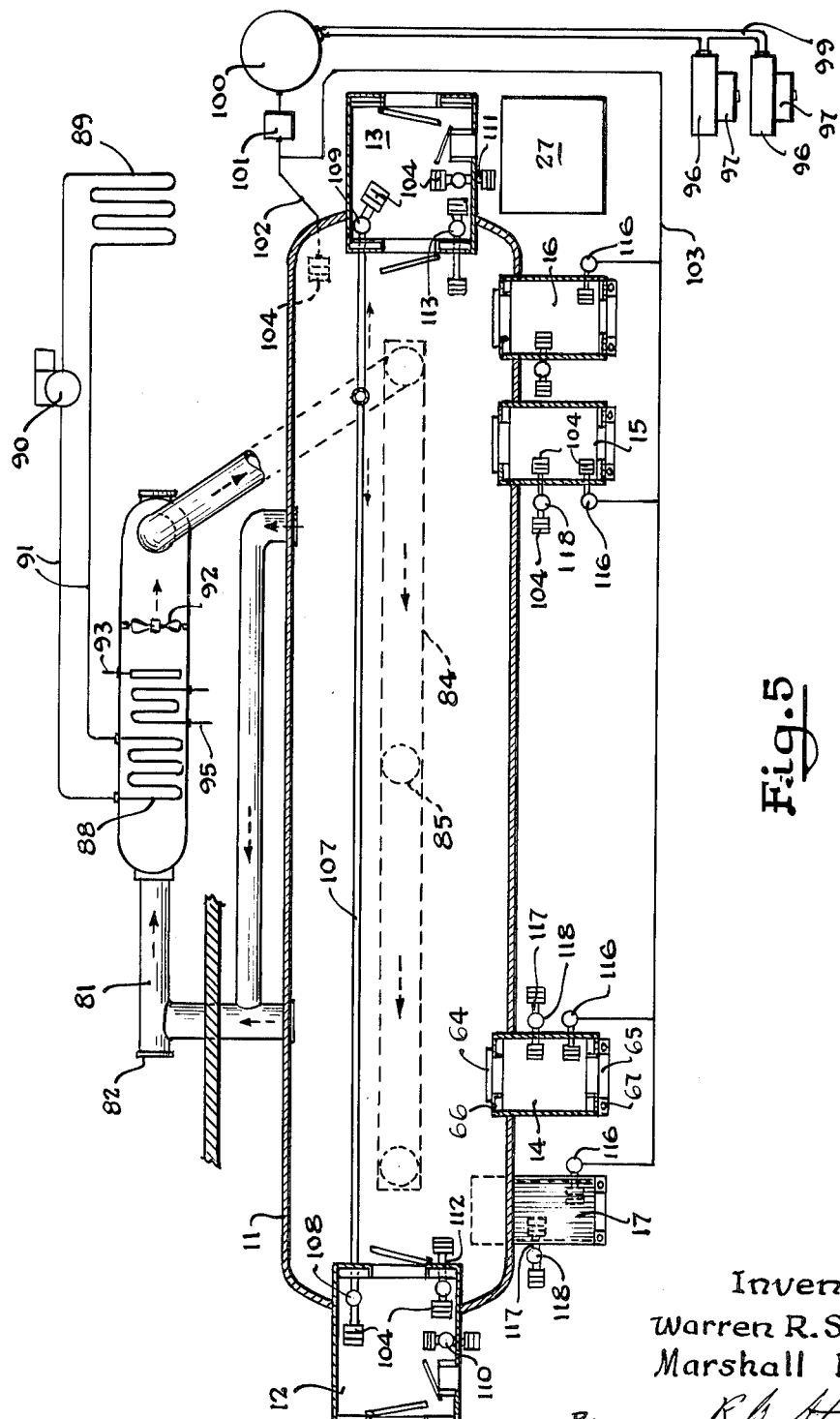

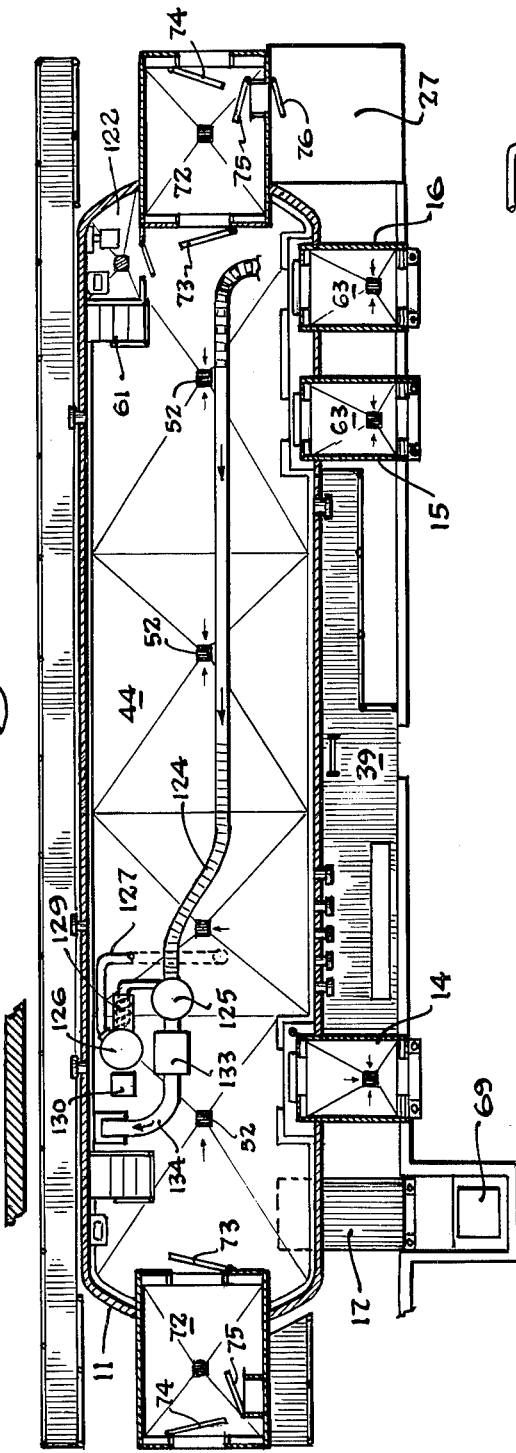

United States Patent Office 3,255,690
Patented June 14, 1966

3,255,690
PRESSURE CHAMBER STRUCTURE
Warren R. Schack, Western Springs, Ill., and Marshall Long, Overland Park, Kans., assignors to Swift & Company, Chicago, Ill., a corporation of Illinois
Filed Dec. 30, 1963, Ser. No. 334,195
9 Claims. (Cl. 99—249)

The present invention relates generally to an improved structure wherein processing operations may be undertaken in a controlled environment; and more specifically relates to an enclosed structure, and environmental control apparatus therefor, wherein foods may be processed and packaged by operating personnel at superatmospheric pressure.

Generally speaking, there are two methods by which canned foods may be sterilized. The most widely known and practiced method involves retorting filled and closed cans. In that process the food is filled into containers at atmospheric pressure, the containers are then sealed; and a number of containers are placed in a retort wherein they are brought to high temperature for a period of time sufficient to kill all spoilage organisms. The second general method for canning foods involves at least partial sterilization of foods at high temperature and above atmospheric pressures prior to filling into cans. In certain forms of the latter process, the food is filled in cans in an elevated pressure atmosphere. Heretofore the latter forms of canning processes have not achieved wide acceptance in the industry, possibly because of special and expensive equipment involved. The requirement that cans must be filled within a positive pressure atmosphere, has contributed, along with other factors, to limiting such processes to equipment housed within small pressurized compartments. Also, it has been proposed that such a process could be carried out within pressurized enclosures open only to the hands and arms of operators. Such equipment has involved the serious disadvantage of requiring complete disruption of the entire sterilizing and filling operations upon failure of any item of equipment, housed within a pressurized enclosure, to allow operating personnel to dismantle the enclosure to gain access to the equipment.

It has also been suggested that a comparable process may be carried out by personnel residing within a pressurized chamber. This invention is an improvement on such a pressurized chamber.

Accordingly, it is a principal object of the present invention to provide an improved enclosed structure wherein operating personnel may conduct processing operations in a controlled atmosphere.

It is a further object of the present invention to provide an improved structure wherein a controlled and conditioned atmosphere at superatmospheric pressure is maintained for the processing of food by personnel present therein.

Basically the present structure comprises a main work chamber capable of containing superatmospheric pressures, and having in communication therewith a plurality of both personnel and equipment locks wherein the pressure may be raised and lowered between the main work chamber pressure and atmospheric pressure. The present structure also includes suitable means to supply and recirculate adequate air at the desired elevated pressure, and further means to condition the recirculated high pressure air for the comfort of personnel within the main chamber.

Further objects and advantages of the present invention will become apparent upon reading the following description in conjunction with the drawings wherein:

FIGURE 1 is a perspective view of the structure of the present invention with parts of a surrounding foundation broken away;

FIGURE 2 is a partial side elevation view showing the support of the structure of FIGURE 1;

FIGURE 3 is a plan view of the structure of FIGURE 1;

FIGURE 4 is a sectional end elevation of the structure of FIGURE 1 taken at line 4—4 in FIGURE 3;

FIGURE 5 is a schematic plan view of the structure of FIGURE 1 showing high pressure air piping and air conditioning equipment;

FIGURE 6 is a schematic plan view of the structure of FIGURE 1 showing the layout of the main processing chamber, personnel locks, and one food processing line; and FIGURE 7 is a schematic plan view of the structure of FIGURE 1 showing the layout of a lower level therein.

A preferred embodiment of the invention shown in the drawings comprises a substantially cylindrical structure, generally 10, having an overall length, end to end, of one hundred ten feet and a maximum diameter of eighteen feet. The structure includes a main work chamber 11 (measuring eighty feet by eighteen feet diameter) having personnel air locks 12, 13 at each end, and a plurality of equipment locks 14, 15, 16, 17 extend outwardly of the main chamber 11 along one side thereof and at one or more levels. By providing a plurality of both personnel and equipment locks the structure is made safe and readily accessible as one personnel lock may always be available at each pressure level during operations; and equipment or materials may quickly be delivered or removed at points near the locale of need.

The above-noted structure, generally 10, has two operating levels, as will hereinafter be disclosed in greater detail, and is accordingly preferably located within a pit or depressed area, generally 20, having a lower floor 21 at a level substantially below the main work floor 22 of a conventional plant building. Disposed adjacent the cylindrical structure, generally 10, is a source of air under pressure, generally 24, and air recirculation and conditioning means, generally 25, to be hereafter described. Also, immediately adjacent one personnel lock 13, is located a control house, generally 27, having a window 28 overlooking the exterior of the main chamber 11, from which overall supervision and control of personnel safety, chamber environment, and food processing may be maintained.

Food product to be filled into containers within the main chamber 11 is delivered thereto preferably through an insulated conduit 30 from a continuous pumping means, generally 31. An example of the latter means may be a continuous stuffer such as that disclosed in Patent No. 3,108,318. The food product is heated within the conduit 30 preferably by steam introduced through a plurality of steam injector segments 32 which are also connected to a suitable source of high pressure steam (not shown) through a manifold 33.

Containers for the food product are delivered empty into the main chamber 11 through one or more container delivery transfer locks, generally 35, which preferably comprise a rotary unit sealed against the exhaust of high pressure air from within the main chamber. Subsequently, filled containers are discharged from the main chamber 11 through one or more similar discharge locks, generally 36 (visible in FIGURE 7). The exterior of the structure, generally 10, is made accessible to maintenance personnel and the like by way of an overhead catwalk 38 and plant floor level gratings 39 which may be seen best in FIGURES 1 and 2.

As may be seen in FIGURE 4, the walls of the structure, generally 10, including the main chamber and both personnel and material locks, is preferably comprised of a welded metal inner wall 41 enclosed within a layer of thermal insulation 42 and an outer skin of corrugated metal 43. The cylindrical shape of the structure is highly desirable to provide sufficient strength to withstand stresses resulting from the pressure differential between interior and exterior. The interior of the main chamber 11 is divided horizontally, at approximately its mid-level, by an internal floor 44, preferably of reinforced concrete. This provides two convenient processing levels, namely product handling and filling, and filled container processing, both readily accessible to personnel and equipment; although the personnel may operate primarily in the upper level with the result that air need not be recirculated directly to the lower level. The entire structure 10 is supported upon a plurality of legs 45 extending from the inner wall 41 at both sides of the main chamber 11. The support is such as to allow for a longitudinal movement at both ends of the structure, generally 10, which may be induced through temperature and internal pressure factors. Accordingly, the central legs 46 are fixed in concrete piers 47, which parallel the sides of the structure. Each pier supports a steel track 48, and the remaining legs 45 are supported on rollers 49 set on the tracks.

Further concerning the interior of the main chamber 11, the internal floor 44, as seen in FIGURE 6, is dished in a number of zones to an equal number of floor drains 52 which are in turn connected to a collection pipe 53 extending longitudinally of the chamber beneath the internal floor. Similarly, the lower level of the main chamber 11, as seen in FIGURE 7, drains into a number of floor drains 54 which are in turn connected to an outside collection pipe 55. Both collection pipes 53 and 55 are connected to a discharge pump 56 outside of the structure, generally 10, which serves to expel drainage from the structure, generally 10, into a sewer outlet 57 without escape of the high pressure air from within the structure. A suitable floor grating 59 is located centrally and longitudinally of the lower level of main chamber 11 (visible in FIGURES 4 and 7) and a pair of access ladders 60, 61, are provided at either end of the main chamber between the lower level and upper level above the floor 44. This construction facilitates proper cleaning and sanitation of the handling equipment and chamber surfaces essential to a food processing establishment.

The material locks 14, 15 and 16 are ranged along one side of the main chamber 11 at the level of the internal floor 44, which is also preferably at the level of the plant floor 22 to provide convenient access between the chamber interior and exterior at several locations making all areas of the chamber available for prompt, unhindered service. Each material lock comprises a semicylindrical chamber 62 above a floor 63 which is also preferably drained through a pump, not shown. The end of the chamber 62 extending into the main chamber 11 may be hermetically closed by means of a vertically movable gate 64. A similar vertically movable gate 65 is located to close the outer end of the chamber 62 external of the main chamber 11. Each of the vertical gates 64, 65, are counterweighted within frames 66, 67, respectively, and are seated within suitable gaskets, not shown. As may be seen in FIGURE 4, the external gate 65 and frame 67 are straight vertically; whereas the internal gate 64 and frame 66 extend both vertically and inclined along the inside of the main chamber wall 11.

With respect to the material lock 17, which is located at the lower level of the main chamber 11, the structure is substantially the same as heretofore described except that it is preferable to employ a hinged door 68 internal of the main chamber 11. Also, it is preferable to provide an elevator 69 immediately adjacent the external end of the lock 17 movable between its floor level and the level of the plant floor 22.

Each of the personnel locks 12, 13, are similarly constructed and comprise semicylindrical chambers 71 above floors 72 coextensive with the internal floor 44 of the main chamber 11. Preferably, each of the personnel locks are of a size sufficient to transfer an entire crew of personnel of about eight to ten operators. In the preferred embodiment, these personnel locks are approximately ten feet long and nine feet wide. Each includes a hinged door 73 leading into the main chamber 11 and pivoted to swing into the latter. The personnel locks also include two outer hinged doors 74, 75, at the longitudinal ends and sides thereof, respectively. Each of the latter two doors is pivoted to swing into the chambers 71 of the personnel locks. Accordingly, it will be obvious that relatively high pressure air will always tend to hold closed each of the personnel access doors and thus the personnel locks 12, 13, must be adjusted to the pressure to which the operators are proceeding before the appropriate doors may be readily opened. For convenience, the hinged side door 75 of personnel lock 13 is located directly opposite a door 76 leading from the control house, generally 27.

As may be seen best in FIGURES 2, 4 and 5, air under pressure from the main chamber 11 is continuously recirculated through, and a separate enclosed vessel 80, spaced from the main cylindrical structure, generally 10, and connected therewith by suitable air delivery and return ducts. A pair of return air ducts 81 extend from one side of the main tank 11 just above the internal floor level to one end of the vessel 80. A removable access plate 82 is provided at that end of the vessel 80 for both maintenance purposes and also to permit entry of fresh atmospheric air into the system when not under pressure. An air delivery duct 83 extends from the upper, opposite end of vessel 80 to an overhead header 84 which extends outside and above the length of the main chamber 11 and is connected therewith by three downspouts 85. Substantial operational savings are effected by this design as minimum quantities of outside air are required to be brought to proper temperature, humidity, and pressure conditions for both personnel comfort and product handling requirements. Also, it will be understood that air may be circulated to the main chamber 11 in the reverse direction, if desired, through ducts 81, and returned to vessel 80 through ducts 83.

The vessel 80 contains a maintenance access plate 86 at the side thereof, convenient to a refrigerant evaporator coil 88 within the vessel. The evaporator coil 88 is in turn connected to the usual refrigerant circuit including a condenser 89 and pump 90 by means of tubing 91. Both the condenser 89 and pump 90 are preferably located external of both the vessel 80 and main cylindrical structure, generally 10. Also housed within the vessel 80 are an air impeller 92 and humidity regulating apparatus 93. In connection with the latter and the evaporator coil 88, a condensate drain 94 extends from the vessel 80 through a suitable pump to a sewer. The latter pump may, in some instances, be the discharge pump 56. A heater 95 is also located within vessel 80 for use in winter months if the ambient air necessitates heating rather than cooling of the pressurized air.

A preferred source of high pressure air comprises a pair of centrifugal pumps 96 driven by electric motors 97, all mounted upon a concrete pedestal 98 located in the pit 20 adjacent the control house, generally 27. The centrifugal pumps 96 are connected by means of a high pressure line 99 to a relatively large volume surge tank 100 at the main work floor 22 of the plant. In turn, the surge tank 100 is connected directly to the lower level area of the main chamber 11 through a pressure control valve 101 and air delivery pipe 102 whereby the resident pressure may be regulated. A second air delivery pipe 103 extends directly from the high pressure supply from pipe 102 at the low pressure side of the control valve 101 to each of the material locks 14, 15, 16 and 17. It should be apparent that pressure adjustments may be made very rapidly in the equipment locks as personnel are not present. Also it should be noted that all air pipes in this system, both inside and outside the cylindrical structure, terminate in mufflers 104 to reduce the noise of moving air to suitable levels. Thus only sufficient make up air is provided on need to the main chamber 11 to replace regulated venting and normally small losses; and high pressure air for the equipment locks is available directly without waste of air conditioning and without air transfer noises within the main chamber.

High pressure air normally delivered to the personnel locks 12 and 13 is conditioned and is obtained through a relatively large diameter manifold 107 which is connected to the header 84 and extend longitudinally through the main work chamber 11 to each of the personnel locks. The manifold 107 terminates at control valves 108, 109, and mufflers in the personnel locks 12 and 13. The foregoing provides a means for raising the pressure within either or both personnel locks from atmospheric to the pressure within the main chamber 11 with properly conditioned air. Pressure within the personnel locks may be lowered to atmospheric pressure by means of air pipes 110 and valves 111. An additional connection is made directly between each of the personnel locks and the interior of the main chamber 11 through air pipes 112 and valves 113. It should be understood that the above mentioned valves are normally monitored from the control house 27, which is constantly in audio contact with operating personnel; and adjustments in pressure are made slowly to avoid health impairment of the personnel.

Each of the material locks 14, 15, 16 and 17 are controlled, with respect to pressure, by means of valves 116 connected to the air delivery pipe 103, and then pipes 117 and valves 118 connected between each of the material locks and atmosphere. Valves 116 may be actuated from the control house 27. The ends of each of the aforementioned pipes are also attached to mufflers to reduce the noise to acceptable levels.

Within the upper level of the main chamber 11, conditioned air entering through the downspouts 85 is directed by arcuate air diverters 120 mounted on a plurality of threaded studs 121 extending from the chamber wall 41. The arcuate diverters 120 may be thus adjusted by the studs 121 to direct the air to favored locations, if desired. Suitable personnel toilet facilities 122 are also provided at one end of the upper level of the main work chamber 11 for the comfort and cleanliness of personnel who remain therein for substantial periods. Additionally, adequate electric lamps 123 are mounted on the inner wall 41 for illumination. An overhead can track 124 extends from beneath the position of the container delivery lock 35 and runs generally longitudinally of the main chamber 11 to deliver cans to a filling machine 125. The food product delivered to the main chamber 11 through the conduit 30 is delivered to a deaerator, generally 126, by means of an infeed pipe 127. The deaerator includes a baffles chamber 128 above an auger discharge 129, which is powered by an electric motor 130. The auger discharge 129 forces the food product into the can filler 125 and filled cans are then delivered to a closing machine 133 wherefrom the cans are carried by a further track 134 through an opening in the floor 44 to the lower level of the chamber 11.

As may be best seen in FIGURES 4 and 7, the lower level of the main chamber 11 includes a waste tank 136 and discharge pump 137 servicing the aforementioned toilet facilities 122. However, the main portion of the lower level is normally adapted for the heat processing of filled containers and includes along one side a hot zone 138 comprising an endless conveyor 139 for carrying the filled containers through ten independently temperature controlled and enclosed sections 140. Each of the latter includes separate air circulation and heating equipment, not shown, in addition to hot water sprays 141 and sumps 142 with water recirculation equipment. At the far end of the hot zone 138, a transfer conveyor 143 is disposed transverse of the main chamber to convey the filled cans from the conveyor 139 to a cooling zone 144 ranged along the opposite side of the chamber 11 with similar independently controlled sections. The latter comprises an endless conveyor 145 passing between a plurality of cold water sprays 146 and sumps 147 also provided with water recirculation equipment. Cans reaching the terminal end of conveyor 145 are then delivered by a discharge conveyor 148 to a can discharge valve 36 by means of which the containers are discharged from the chamber, generally 10. All of the equipment in the lower level of the chamber is readily accessible to personnel, even during operation, whereby the equipment may be observed, serviced and corrected as required.

After discharge from the chamber, containers are immediately delivered to can cooling apparatus, generally 150, by means of a can track 151 extending from beneath the outlet of valve 36 exterior of the structure, generally 10. Finally, the filled containers are carried from the cooling apparatus 150 on an inclined discharge conveyor 152, which carries the cooled containers continuously from the lower floor level 21 of the pit 20 to the main work floor level 22 of the processing plant whereat the can may be labeled and cased for shipment.

It will be readily understood that suitable electric and water mains communicate between the exterior and interior of the pressurized chamber 11, although not shown in the drawings. Water from a normal city supply, or the like, will usually be at a sufficient pressure to flow into the chamber; however, it is within the purview of the present invention to provide a suitable pressurized reservoir outside the chamber. Also, it is preferred that hot water be provided from water heaters, also not shown, located outside the chamber, insofar as possible although heaters may be located therein for adjustment of recirculated water used, for instance, at sprays 141.

Obviously many modifications and variations of the invention as hereinbefore set forth may be made without departing from the spirit and scope thereof, and therefore only such limitations should be imposed as are indicated in the appended claims.

We claim:

1. An improved structure for accommodating personnel processing food materials under superatmospheric pressure, said structure comprising: a main enclosed cylindrical work chamber for containing said personnel and superatmospheric pressure, said chamber having first and second ends and the axis of said chamber being horizontal; a plurality of legs extending downwardly from both sides of said chamber, the central leg along each side being secured in position and the remaining legs outwardly thereof resting on rollers for movement longitudinal of said chamber axis; a personnel air lock connected to said chamber at each of said first and second ends; a plurality of equipment air locks ranged along one side of said chamber and extending outwardly therefrom; a container delivery valve positioned at the top of one of said first and second ends of said main chamber; a container discharge valve positioned at the bottom of one of said first and second ends of said chamber; air conditioning means located outside said chamber and in communication therewith for adjusting the temperature and humidity of pressurized air for said chamber; and air pumping means connected to deliver sufficient quantities of air at elevated pressure to maintain air pressure at desired levels within said chamber and said personnel and equipment locks.

2. In a structure for accommodating personnel processing food materials under superatmospheric pressure wherein said structure includes a main cylindrical work chamber and at least one air lock for personnel, at least one equipment air lock, and container entrance and exit valves, the improvement comprising: a separate enclosed vessel adjacent and exterior a first side of said main chamber; a plurality of large ducts connected between said vessel and the top and said one side of said main chamber whereby both said vessel and said chamber undergo identical pressure conditions; air conditioning means located in said vessel, said air conditioning means for adjusting the temperature and humidity of air for said main chamber; air circulating means within said vessel for continuously recirculating air between said chamber and said vessel through said ducts; a surgetank adjacent and exterior of both said chamber and said vessel, said surgetank being a reservoir for high-pressure air and connected to the lower portion of said chamber through a pressure control valve; and an air pump connected to said surgetank to force air thereto at high pressure.

3. The structure of claim 2 wherein a first pipe is connected between said air ducts and said personnel air lock for delivering conditioned air thereto; and a second pipe is connected between said pressure control valve and said equipment locks for delivering unconditioned high-pressure air to the latter.

4. The structure of claim 3 including two personnel air locks at opposite ends of said main chamber.

5. The structure of claim 3 including a plurality of equipment air locks spaced along a side of said main chamber opposite said first side.

6. The structure of claim 2 wherein a plurality of floor drains are located in said floor and in the bottom of said chamber, all of said drains being connected to collection pipes and pumps for discharging liquids from said drains into a sewer system exterior of said chamber.

7. The structure of claim 2 wherein said work chamber is divided into upper and lower levels by a horizontal floor and food product handling equipment is located within said upper level of said chamber, said handling equipment essentially comprised of a deaerator, can filler and can closer; and filled container processing equipment is positioned within the lower level of said chamber, said container processing equipment essentially comprised of a plurality of independently temperature controlled hot zones ranged along one side of said lower level, and a cooling zone ranged along the opposite side of said lower level, and conveyors trained for transporting cans from said upper level through said zones in said lower level to said discharge valve.

8. The structure of claim 7 wherein said main chamber rests upon a plurality of legs extending downwardly from both sides thereof, the central leg along each side being secured in position and the remaining legs outwardly thereof resting on rollers for movement longitudinal of said chamber axis.

9. The structure of claim 7 including a plurality of equipment air locks spaced along a side of said main chamber opposite said first side, and wherein at least one of said equipment air locks is at said lower level.

References Cited by the Examiner

UNITED STATES PATENTS

| | | | |
|---|---|---|---|
| 280,040 | 6/1883 | Howland | 98—39 |
| 1,107,745 | 8/1914 | Batter | 98—33 X |
| 1,224,180 | 5/1917 | Lake | 98—33 |
| 2,541,113 | 2/1951 | Smith et al. | 99—249 X |
| 3,170,828 | 2/1965 | Irvine | 50—52 X |

OTHER REFERENCES

"Life Magazine," volume 42, March 18, 1957, pages 146–148.

WALTER A. SCHEEL, *Primary Examiner.*

CLYDE I. COUGHENOUR, *Assistant Examiner.*